Patented Sept. 5, 1950

2,520,902

UNITED STATES PATENT OFFICE 2,520,902

QUATERNARY AMMONIUM SALTS OF PYRIDINE COMPOUNDS

Frederick C. Bersworth, Verona, N. J.

No Drawing. Application August 5, 1947, Serial No. 766,470

4 Claims. (Cl. 260—296)

This invention relates to new chemical compounds which are derivatives of alkylene or polyalkylene polyamines and which contain one or two quaternary pyridinium radicals in the molecule. These compounds I have found to be useful as bactericides and more particularly as bactericides having polyvalent metal sequestering action.

Quaternary pyridinium compounds are known to be useful bactericides. The usefulness of these compounds is, however, somewhat limited in the presence of hard water flocks because the colloidal material tends to surround and protect bacteria.

It is an object of this invention to prepare and provide the new chemical compounds of the kind referred to above, and which have the general formula:

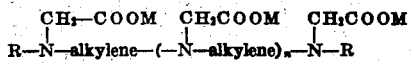

wherein R is

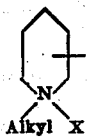

$n$ is one of the group consisting of zero and a positive integer, alkylene is an alkylene group containing not more than four carbon atoms, and M is a member of the group consisting of alkali metal and hydrogen, alkyl is a long chain aliphatic group, and X is a member of the group consisting of chlorine, bromine, iodine and hydroxyl.

In general the process of making the products herein described is a two-step process. The first step preferably consists in reacting an amino pyridine with a suitable halogenated compound to form an intermediate product, the intermediate product containing at least two amino nitrogen atoms. The second step consists in replacing the hydrogen atoms or the amino nitrogen atoms with acetic acid groups. The pyridyl group may or may not be treated before the first step with an alkyl halide to form a quaternary salt. Preferably the quarternary compound should be first formed before the condensation with the halogenated compound. The first step may be carried out by condensing amino pyridine with an aliphatic compound in which either one or both terminal carbon atoms are bonded to a halogen atom. The intermediate product may then be reacted according to my U. S. Patent 2,407,645, or to the chloracetic acid process, to replace with acetate groups the hydrogen atoms remaining on the amino nitrogen atoms. These processes, and modifications thereof, for making the compounds of this invention will be illustrated in the examples which follow.

Example I

Two molar equivalents of lauryl α-amino pyridinium chloride are condensed with one molar equivalent of di(chlor ethyl) amine by heating the two together. The hydrochloride salt which crystallizes out is treated with caustic to set free the base. The intermediate product is believed to have the following formula:

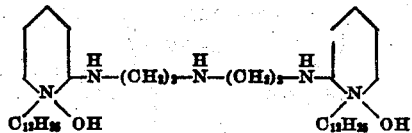

This product is reacted according to my U. S. Patent 2,407,645 with formaldehyde, sodium cyanide and sodium hydroxide and then with hydrochloric acid, to yield a crystallizable compound believed to have the formula:

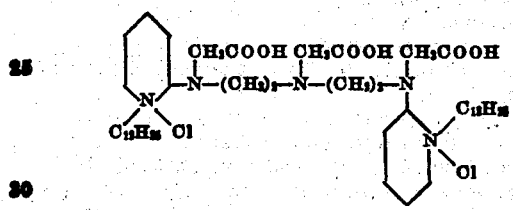

Example II

Two molar equivalents of lauryl γ-amino pyridinium chloride are reacted according to conventional procedure i. e. by mixing and heating together with one molar equivalent of butylene 1,4 dichloride. The product crystallizing out is the intermediate product as the hydrochloride. The free base is liberated with caustic. The resulting product is then reacted as in Example I according to my U. S. Patent 2,407,645, and then with hydrochloric acid, to yield a crystallizable compound believed to have the formula:

Example III

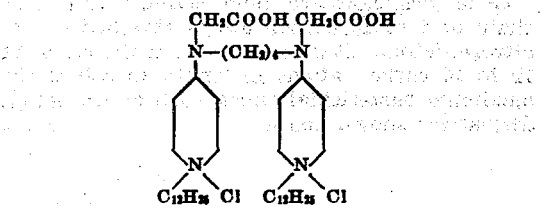

One molar equivalent of lauryl α-amino pyridinium chloride is condensed with one molar equivalent of 1-chlor 2 amino ethane

by heating the two together. The resulting product mono lauryl α-pyridyl ethylene diamine hydrochloride crystallizes out, is treated with NaOH to liberate the free base, and is then reacted with sodium cyanide, formaldehyde and sodium hydroxide according to my U. S. Patent 2,407,645. Finally the product is reacted with hydrochloric acid to yield a crystallizable compound believed to have the formula:

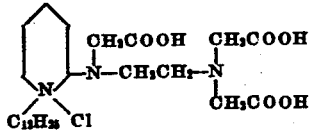

The 1-chlor 2 amino ethane may be made according to the procedure reported by Seitz, B. 24, 2626.

*Example IV*

Two molar equivalents of lauryl α-amino pyridinium bromide are reacted by heating and mixing with one molar equivalent of symmetrical ethylene dichloride. After treating with caustic, the resulting product is reacted with sodium cyanide, formaldehyde and sodium hydroxide to yield a crystallizable product having the formula:

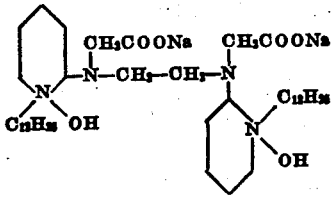

If desired a halogen may be made to replace the —OH groups on the nitrogens by reacting with an acid such as HCl, HBr, or HI. In such case the sodium acetate groups become acetic acid groups.

Similarly other pyridines may be reacted with alkylene chlorides to form the compounds of this invention.

Among the general characteristics of the compounds of this invention are that they are excellent bactericides in general and particularly in the presence of hard water and soap. The compounds disclosed above are generally yellowish colored crystalline salts which are soluble in water, and in dilute alcohol solutions. They have an iso-electric point of between 1.2 and 1.8. The compounds may be thought of as containing "solubilizing" groups (the acetate groups) and "non-solubilizing" groups (the aryl groups). In those compounds containing multiple "solubilizing" groups and only a single "non-solubilizing" group the solubility in water is quite marked. In those compounds containing a lower ratio of "solubilizing" to "non-solubilizing" groups the solubility is decreased, although still appreciable. They are cationic active agents.

Good germicides are those having an aliphatic chain of 8 to 18 carbon atoms attached to the nitrogen atom. It is preferred that the chain be 12 to 14 carbon atoms in length to attain the maximum bactericidal effect, such as the lauryl derivatives shown above.

If copper in ionic form is added to an aqueous solution of one of the compounds of this invention, a copper complex is apparently formed which is soluble in water. This complex has been found to be an excellent fungicide, and may be added to hard water in the presence of soap without the formation of a curdy precipitate.

The importance of the elimination of a hard water flock in the presence of a strong alkali or soap is great. It has been shown that upon the formation of a hard water flock, whether as the result of the formation of calcium hydroxide or calcium (or magnesium) soap, bacteria are protected. A medium apparently bacteria-free after treatment with phenol, and having a flock of calcium soap, was filtered, the precipitate was thoroughly washed with sterile water and added to bacteria free serum. The bacteria became active again. The compounds described herein eliminate any possibility of any contaminated flock.

I claim:

1. A compound represented by the formula:

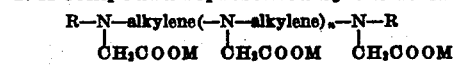

wherein R is

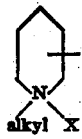

n is one of the group consisting of zero and the positive integer 1, alkylene is an alkylene group containing not more than four carbon atoms, and M is a member of the group consisting of alkali metal and hydrogen, alkyl is a long chain aliphatic group, and X is a member of the group consisting of chlorine, bromine, iodine and hydroxyl.

2. A compound according to claim 1 wherein the alkyl group is an aliphatic chain containing twelve to fourteen carbon atoms.

3. A compound represented by the formula

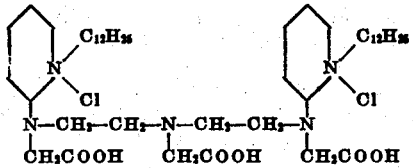

4. A compound represented by the formula

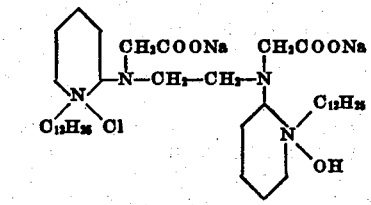

FREDERICK C. BERSWORTH.

No references cited.